US006438908B1

(12) United States Patent
McDonald

(10) Patent No.: US 6,438,908 B1
(45) Date of Patent: Aug. 27, 2002

(54) METHOD OF INSTALLING WALL-TO-WALL CARPET AND IMPROVED CARPET

(76) Inventor: Raiford McDonald, 1300 Tiarco Dr., Dalton, GA (US) 30720

( * ) Notice: Subject to any disclaimer, the term of this patent is extended or adjusted under 35 U.S.C. 154(b) by 0 days.

(21) Appl. No.: 09/570,194

(22) Filed: May 15, 2000

(51) Int. Cl.⁷ .................................................. E04F 15/16
(52) U.S. Cl. .......................................... 52/177; 156/71
(58) Field of Search ................................. 156/247, 248, 156/267, 289, 250, 306.3, 71, 258, 256; 52/177, 287.1, 288.1, 506.01, 506.05, 746.1; 428/88, 97, 95, 158, 190, 102, 423.1

(56) References Cited

U.S. PATENT DOCUMENTS 4,849,267 A * 7/1989 Ward et al. ................. 156/291
5,567,497 A * 10/1996 Zegler et al. ................. 428/88

* cited by examiner

Primary Examiner—Richard Crispino
Assistant Examiner—Chan Sing Po
(74) Attorney, Agent, or Firm—Kilpatrick Stockton LLP

(57) ABSTRACT

There is disclosed an improved method of installing wall-to-wall carpet. The method comprises installing a wall-to-wall carpet on a substrate bounded at least partially by opposed walls or vertical structures by applying to the substrate an intermediate member having a top surface, applying to the top surface of the intermediate member the bottom surface of the carpet, the top surface of the intermediate member and the bottom surface of the carpet being constructed such that the surfaces resist relative movement between the intermediate member and the carpet; and cutting the carpet to conform to a desired shape at least partially bounded on two sides by the opposed walls or vertical structures. An improved carpet is also disclosed.

9 Claims, No Drawings

METHOD OF INSTALLING WALL-TO-WALL CARPET AND IMPROVED CARPET

FIELD OF INVENTION

The present invention relates generally to carpets, and, more specifically, to an improved method of installing wall-to-wall carpet.

BACKGROUND OF THE INVENTION

Wall-to-wall carpet has been a popular floor covering for many years. However, the method of installing wall-to-wall carpet has not changed much over the years. Typically, wall-to-wall carpet is installed by nailing tack strips around the periphery of a room in which the carpet is to be installed. If the carpet does not include an integral cushion or pad, a separate cushioning pad may then be placed on the floor between the tack strips. The carpet is cut to a size slightly larger than the actual size of the room. One edge of the carpet is then secured to the tack strips adjacent that edge and trimmed with a knife to exact size, usually to fit under a baseboard. The carpet is then stretched so that it is under tension and the opposite edge of the carpet is secured to the tack strip adjacent that opposite wall. A similar procedure is followed to secure the lateral edges of the carpet. The carpet is then trimmed to the exact dimensions of the room so that the carpet extends from wall-to-wall.

It is necessary to stretch wall-to-wall carpet when it is installed so that the carpet will not wrinkle, puckering, buckle or otherwise assume a non-planar shape due to dimensional changes of the carpet. Since the carpet is bounded on opposite ends by fixed walls, any significant increase in the length of the carpet due to increases in humidity or moisture conditions will produce wrinkling, puckering or buckling of the carpet. Therefore, carpets are usually stretched or "kicked in" during installation to avoid problems associated with humidity or moisture induced dimensional changes.

Stretching of wall-to-wall carpet does not always solve the problem of wrinkling or buckling of the carpet over a period of time. Frequently, wall-to-wall carpets must be re-stretched due to elongation of the carpet under tension.

Due to the disadvantages of the tack strip method of installing wall-to-wall carpet, alternative methods of installation have been developed. One such alternative method is to glue the carpet to the floor with an adhesive. However, when the carpet is removed, particularly carpet that includes an integral, cushioning pad, a significant residue is left on the floor requiring relatively large amounts of labor to prepare the floor for a subsequent installation of another floor covering. Furthermore, like tack-strip installed carpet, glued-down carpet cannot easily be removed for cleaning.

Another alternative method of installation of wall-to-wall carpet is the hooks and loops, such as Velcro, method of installation. Instead of installing tack strips around the periphery of a room, strips of either hooks or loops are glued to the floor. Corresponding mating strips of hooks or loops are then glued or otherwise attached to the edge of the carpet so that when the strip on the floor is contacted with the strip on the carpet, the hooks and loops will form a temporary mechanical bond.

The traditional methods of installing wall-to-wall carpet described above have several disadvantages. First, they are labor intensive and time consuming processes, and, therefore, are relatively expensive to perform. Second, installation is relatively permanent; therefore, the carpet cannot be easily removed for cleaning. Third, installation requires special tools. Fourth, the installation is not conducive to working with combinations of carpets, colors and the like, for design development and color contrast visual effects. Last, the take-up and removal of traditionally installed carpet is a relatively significant portion of the cost of replacing carpet. Thus, a need exists for an improved method of installing wall-to-wall carpet that overcomes the disadvantages of the prior art.

SUMMARY OF THE INVENTION

The present invention satisfies the above-described needs by providing an improved method of installing wall-to-wall carpet. The method comprises installing a wall-to-wall carpet on a substrate bounded at least partially by opposed walls by securing to the substrate an intermediate member having a top surface comprising a skid resistant plastic film, applying to the top surface of the intermediate member the bottom surface of the carpet comprising a skid resistant plastic film, such that said carpet resists dimensional changes due to changes in moisture or humidity without the use of tack strips securing the periphery of said carpet to said substrate, said intermediate member and said carpet being substantially free of adhesive for retaining said carpet and said intermediate member together; and cutting the carpet to conform to a desired shape at least partially bounded on two sides by the opposed walls.

In another embodiment of the present invention, the method comprises installing a wall-to-wall carpet on a substrate bounded at least partially by opposed walls, the carpet having a bottom surface, by applying to the substrate an intermediate member comprising a layer of polyurethane foam attached on one side to a layer of nonwoven textile material and on the other side to a skid resistant plastic film, the nonwoven layer being disposed adjacent to the substrate; applying to the plastic film surface of the intermediate member the bottom surface of the carpet, the bottom surface of the carpet having a skid resistant plastic film attached thereto such that said carpet resists dimensional changes due to changes in moisture or humidity without the use of tack strips securing the periphery of said carpet to said substrate, said intermediate member and said carpet being substantially free of adhesive for retaining said carpet and said intermediate member together; and cutting the carpet to conform to a desired shape at least partially bounded on two sides by the opposed walls.

In another embodiment of the present invention, the method of installing a wall-to-wall carpet on a substrate bounded at least partially by opposed walls, the carpet having a bottom surface, comprises applying a skid-resistant coating to the substrate, applying to the coated substrate the bottom surface of the carpet that includes a skid resistant plastic film such that said carpet resists dimensional changes due to changes in moisture or humidity without the use of tack strips securing the periphery of said carpet to said substrate, said substrate and said carpet being substantially free of adhesive for retaining said carpet and said substrate together and cutting the carpet to conform to a desired shape at least partially bounded on two sides by the opposed walls.

In a further embodiment of the present invention, the method of installing a wall-to-wall carpet on a substrate bounded at least partially by opposed walls, said carpet having a bottom surface, comprises applying a skid-resistant coating to the substrate, applying to the coated substrate an intermediate member having a top surface comprising a skid resistant plastic film, applying to the top surface of the intermediate member the bottom surface of the carpet, the bottom surface of the carpet comprising a skid resistant plastic film such that said carpet resists dimensional changes due to changes in moisture or humidity without the use of tack strips securing the periphery of said carpet to said substrate, said intermediate member and said carpet being substantially free of adhesive for retaining said carpet and said intermediate member together; and cutting the carpet to conform to a desired shape at least partially bounded on two sides by the opposed walls.

In yet another embodiment of the present invention, the method comprises installing a wall-to-wall carpet on a substrate bounded at least partially by opposed walls by securing to the substrate an intermediate member having a top surface comprising a skid resistant plastic film, applying to the top surface of the intermediate member the bottom surface of the carpet comprising a skid resistant coating, such that the carpet resists dimensional changes due to changes in moisture or humidity without the use of tack strips securing the periphery of the carpet to the substrate, the intermediate member and the carpet being substantially free of adhesive for retaining the carpet and the intermediate member together; and cutting the carpet to conform to a desired shape at least partially bounded on two sides by the opposed walls.

In still another embodiment of the present invention, the method comprises installing a wall-to-wall carpet on a substrate bounded at least partially by opposed walls by applying to the substrate the bottom surface of the carpet comprising a skid resistant plastic film, such that the carpet resists dimensional changes due to changes in moisture or humidity without the use of tack strips securing the periphery of the carpet to the substrate, the carpet being substantially free of adhesive for retaining the carpet and the substrate together; and cutting the carpet to conform to a desired shape at least partially bounded on two sides by the opposed walls.

Accordingly, it is an object of the present invention to provide an improved method of installing wall-to-wall carpet.

Another object of the present invention is to provide a method of installing wall-to-wall carpet wherein the carpet can be relatively easily removed.

A further object of the present invention is to provide a method of installing wall-to-wall carpet such that the carpet has improved dimensional stability.

Still another object of the present invention is to provide a method of installing wall-to-wall carpet such that the carpet resists wrinkling, puckering, buckling, bulging or the like due to changes in moisture and/or humidity.

Yet another object of the present invention is to provide a method of installing wall-to-wall carpet that does not require that the carpet be stretched and/or the use of tack strips.

These and other objects, features and advantages of the present invention will become apparent after a review of the following detailed description of the disclosed embodiments and the appended drawing and claims.

DETAILED DESCRIPTION OF THE DISCLOSED EMBODIMENTS

The present invention comprises a method of installing wall-to-wall carpet. This method is novel because it does not require the use of tack strips, conventional adhesives or other conventional methods of securing the carpet to the floor, and also does not require that the carpet be stretched.

As used herein the term wall-to-wall carpet is used in its conventional sense to mean a carpet that extends over an entire floor area from one vertical wall or vertical structure to the opposing vertical wall or vertical structure. The term wall-to-wall carpet is also used herein to mean either a continuous piece of material or a plurality of carpet tiles laid adjacent to each other so as to span from wall-to-wall. Thus, wall-to-wall carpet is bounded at least partially by opposed walls so that any substantial increase in the length of the carpet after it is installed will result in buckling, puckering or wrinkling of the carpet. The term carpet is also used in its conventional sense to mean a carpet that is either tufted or woven.

The present invention may be used in any application where wall-to-wall carpet is installed. The present invention is well-suited for use in both conventional residential homes, office buildings and other commercial buildings. Furthermore, the present invention may be used in manufactured homes and recreation vehicles. In addition, the present invention can be used as a temporary installation method for exhibition or exposition halls or displays.

Tufted carpet is known by those skilled in the art to comprise a primary backing material, made of natural or synthetic fibers, such as a flat strand woven polypropylene, through which yarn is tufted, thereby forming a face pile on one side of the primary backing and loop backs on the other side. The loop backs are usually secured to the primary backing by a precoat adhesive, such as styrene butadiene synthetic rubber, latex, polyurethane polymers, ethyl vinyl acetate and hot melt adhesives. To provide additional dimensional stability, a secondary backing is commonly used. Secondary backing material, made of natural or synthetic fibers, such as leno weave polypropylene, is usually adhesively attached to the primary backing. Adhesives typically used to attach secondary backing to primary backing include, styrene butadiene synthetic rubber, polyurethanes, ethyl vinyl acetates and hot melt adhesives. A typical secondary backing material that comprises a leno weave polypropylene is known as ActionBak® which is available from Amoco Fabrics and Fibers Co. of Dalton, Ga.

Alternately to the secondary backing, or in addition thereto, an integral foam cushion may be applied to the backing of the carpet. Carpet with an integral foam cushion does not require the use of a conventional carpet pad under the carpet when it is installed. The integral foam cushion can be made of natural materials or synthetic materials, such as styrene butadiene rubber and polyurethane. The foam can be cast separately and adhesively applied to the carpet back. Or, the foam cushion can be formed in situ on the carpet back. If the carpet includes an integral foam cushion, it is preferred that the foam be formed in situ on the carpet back and be of polyurethane between approximately 1 mm and 12 mm thick and have a density of between approximately 1.5 and 40 pounds per cubic foot. It is well known in the art how to form in situ polyurethane foam on a carpet back, and, therefore, further description will not be provided here.

If the carpet does not have an integral cushion attached thereto, it is typical to install a conventional cushioning pad under the carpet. Cushioning carpet pads are made from a cushioning material, such as foams. But, recently, carpet pads have been made from recycled foam that is cut into relatively small pieces and laminated together into a sheet. Carpet pad is also used herein in its common sense as known by those skilled in the art.

The present invention can be used with all types of carpet, with or without an integral cushion, and on all types of floors. The present invention can be used to apply carpet to floors made of wood, such as plywood or hardwood, oriented strand board, concrete, masonry, and the like.

The method of the present invention is practiced as follows. An intermediate member is applied to the floor and extends from wall-to-wall, or substantially from wall-to-wall, and may be either mechanically or adhesively secured thereto when required as explained further below. As used herein the term "substantially from wall-to-wall" means that the intermediate member extends the majority of the way between opposed walls. It is a common practice in the carpet industry to trim a carpet pad anywhere from a fraction of an inch to several inches way from the baseboard wall. The intermediate member of the present application can be trimmed like a carpet pad. The present invention will therefore be operative if the intermediate member extends from wall-to-wall or comes at least within a few inches of the baseboard of the wall, and, therefore, extends substantially from wall-to-wall.

The intermediate member has an upper surface that will adjoin the back of the carpet when it is applied that provides either a physical, mechanical or a chemical skid resistance with respect to the carpet back, thereby inhibiting relative lateral movement between the carpet and the intermediate member. The carpet is then disposed on the upper surface of the intermediate member such that the carpet back adjoins the upper surface of the intermediate member. The carpet is then trimmed to fit the dimensions of the floor that it is covering. No tack strips or adhesives are used to secure the carpet, and no stretching or "kicking in" of the carpet is required. The carpet merely lays on top of the intermediate member. The skid resistant properties between the carpet back and the intermediate member serve to hold the carpet in place. Furthermore, it is believed that the skid resistant properties also function to provide dimensional stability to the carpet such that changes in carpet dimensions due to changes in humidity or moisture levels that would otherwise result in wrinkling, puckering or buckling of the carpet are prevented. It is believed that the relatively small forces of the skid resistant properties when added over the entire area of the carpet result in a relatively substantial force that prevents the carpet from moving significantly due to humidity induced changes in size. Thus, wrinkling, puckering and buckling are prevented even though the carpet is not attached at its edges with tack strips, hooks and loops or adhesives and is not under tension.

As stated above the skid resistant property is an essential element of the present invention. The skid resistant property can be produced in a number of different ways. The skid resistant property can be produced by physical, mechanical or chemical means. Embodiments of several different ways of achieving the desired skid resistant property are disclosed below.

One way to achieve the desired skid resistant property of the present invention is to apply a skid resistant coating to a floor over the entire area that will be covered by the wall-to-wall carpet. Therefore, in this case the coating would be the intermediate member. Coatings that are useful in the present invention are natural and synthetic non-skid polymers that have a high coefficient of slip resistance. Polymers that are useful in the present invention include acrylic polymers, natural latex, soft styrene butadiene rubber, and vinyls. The particular chemistry of the coating is not critical, and, therefore, any other polymer that exhibits slip resistant properties can be used in the present invention. Coefficients of slip resistances for the polymers that are useful in the present invention generally are between approximately 0.25 and 2.00 as measured in accordance with ASTM D2047-93. A particularly useful polymer is an acrylic polymer sold under the trademark Hystretch V-43 by B. F. Goodrich, Gastonia, N.C. Depending on the type of floor that is involved, the polymer coating should be between approximately 0.025 mm and 0.5 mm thick and have a coverage rate of between approximately 0.5 oz and 5 oz per square yard.

When a skid resistant coating is applied to the floor, a compatible skid resistant coating must also be applied to the carpet if the carpet does not already have an affinity for the coating on the floor. By a compatible skid resistant coating is meant one that has a physical attraction to the floor coating, such that the skid resistant properties of the present invention are provided. Preferably, the coating that is applied to the carpet is the same coating that is applied to the floor. Therefore, the polymers that are described above for coating the floor can also be used for coating the carpet back. Depending on the construction of the carpet, the skid resistant polymer coating is applied to the carpet surface that will be adjacent the floor, such as the primary backing, the secondary backing, the integral cushion and the like. The temporary bond between the floor coating and the carpet coating must not be so strong that it makes removal of the carpet difficult or causes delamination of the integral cushion, secondary backing or pulls pile loop backs out of the primary backing.

Another way to achieve the desired skid resistant property of the present invention is to provide a physical or mechanical skid resistance between the intermediate member and the carpet. By mechanical skid resistance is meant that there is provided a physical obstacle that resists movement between the two opposed surfaces. Mechanical skid resistance can be provided by applying to the floor an intermediate member that has a top surface that will physically interfere with movement of the back surface of the carpet. For example, an intermediate member, such as a carpet, having a top surface of a secondary backing, such as ActionBak, will provide the necessary physical interference with a carpet that has a back surface of a secondary backing, such as ActionBak®. It is believed that the uneven surface of the ActionBak® on the carpet interferes with or catches on the uneven surface of the ActionBak® of the intermediate layer and thereby resists the two surfaces slipping or moving relative to each other. Attachment of the intermediate member to the substrate or floor is necessary when there is no affinity between the flooring surface and the surface of the intermediate member adjacent the floor. For example, when the surface of the floor is relatively smooth, such as a smooth tile, such that the intermediate member slides easily on the surface, it is necessary to attach the intermediate member to the floor. Depending on the flooring to which the intermediate layer is applied, it may be desirable to attach the intermediate member to the floor, such as with an adhesive or by stapling or nailing. Any suitable adhesive can be used, such as multi-purpose adhesive or pressure sensitive adhesive. Suitable multipurpose adhesives include ATT #677 available from Advanced Adhesives Technology, Dalton, Ga., and #2055 available from W. F. Taylor & Co., Dalton, Ga. Suitable pressure sensitive adhesives include ATT # 320 available from Advanced Adhesives Technology, and # 2027 available from W. F. Taylor & Co. On the other hand, if the surface of the floor is relatively rough, such as rough surfaced fiberboard or concrete, such that the intermediate layer does not easily slide on the floor, the intermediate layer does not have to be attached to the floor and can merely be applied to the floor.

A layer of foam will provide the necessary physical interference with a carpet that has a back surface of a secondary backing, such as ActionBak®. The foam can be made from natural or synthetic polymers, such as polyurethane, styrene butadiene latex and vinyl. The foam should have a thickness of between approximately 1 mm and 12 mm; and a density of between approximately 1.5 pounds per cubic foot and 40 pounds per cubic foot. Conversely, when the intermediate layer has an upper surface of a secondary backing, such as ActionBak®, the back surface of the carpet can be a layer of integral foam cushion. These integral cushions are well known in the art and have been described above. It is believed that the uneven surface of the secondary backing sinks into and forms depression in the adjacent foam surface that thereby resists the two surfaces slipping relative to each other. Therefore, although the present invention has been described as using a secondary backing, such as ActionBak®, any layer that is sufficiently rough or has a sufficiently uneven surface will provide the necessary skid resistance with a corresponding foam surface.

A nonwoven layer of textile material will also provide the necessary physical interference with a carpet that has a back surface of a secondary backing, such as ActionBak®. The nonwoven layer can be made from any textile material, such as polyester, polypropylene and nylon. The nonwoven layer should have a thickness of between approximately 0.25 mm and 4 mm. The nonwoven layer should also have a weight of between approximately 1 and 6 ounces per square yard. It is believed that the uneven surface of the secondary backing sinks into and forms depression in the nonwoven surface that thereby resists the two surfaces slipping relative to each other.

Preferably, the intermediate member is a laminated structure that comprises one layer of a nonwoven textile material adhered to a second layer of a foam material. The nonwoven material and foam material for forming the laminated intermediate member can be chosen from the materials described above. The nonwoven layer should have a thickness of between approximately 0.25 mm and 4 mm. The nonwoven layer should also have a weight of between approximately 1 and 6 ounces per square yard. It is especially preferred that the laminated layer comprises a nonwoven layer of spun laced polyester having a thickness of approximately 0.5 mm and a weight of approximately 2 ounces per square yard. A suitable polyester material is available under the trademark Sontara™ from E. I. Du Pont de Nemours & Co. of Old Hickory, N.C. It is especially preferred that the laminated foam layer comprise a polyurethane foam having a thickness of approximately 1 mm and 12 mm and a density of between approximately 1.5 and 40 pounds per cubic foot; preferably, approximately 20 pounds per cubic foot. A suitable polyurethane foam is available under the trademark KangaCushion™ from Textile Rubber & Chemical Co. Inc. of Dalton, Ga. Furthermore, the nonwoven layer can be adhesively attached to the foam layer, the foam layer can be formed in situ on the nonwoven layer, or the foam layer can be thermally bonded to the nonwoven layer. Methods of bonding nonwoven materials to foam materials are well known in the art, and, therefore, further description is not necessary herein. A suitable laminated intermediate member is available under the trademark KangaCushion™ from Textile Rubber & Chemical Company, Inc. of Dalton, Ga.

When the laminated layer described above is used for the intermediate layer, the laminated layer can be oriented with either the nonwoven layer or the foam layer adjacent the floor. When the laminated layer described above is used for the intermediate layer, it is also desirable for the back surface of the carpet to be a secondary backing, such as ActionBak®. When the nonwoven surface of the laminated layer is adjacent the floor and depending on the type of floor to which it is applied, it may also be desirable to attach the nonwoven layer to the floor, such as by adhesion. Any suitable adhesive can be used, such as multi-purpose adhesives including ATT #677 available from Advanced Adhesives Technology and #2055 available from W. F. Taylor & Co., and pressure sensitive adhesives including ATT # 320 available from Advanced Adhesives Technology, and # 2027 available from W. F. Taylor & Co. The laminated layer can also be attached to the floor by nailing, stapling and the like. Alternately, a coating of a slip resistant polymer as described above, such as Hystretch V-43 by B. F. Goodrich, Gastonia, N.C., can be applied to the floor before the nonwoven layer is applied thereto. The slip resistant polymer provides sufficient affinity between the nonwoven layer and the coated floor such that the advantages of the present invention are realized. As will be discussed below with reference to an alternate embodiment, it may be desirable to not use any adhesives to secure the intermediate layer to the substrate, but, rather, to rely upon the skid resistant properties of the intermediate layer, the substrate or both.

The fact that the carpet is not attached at its edges provides unexpected advantages over conventionally installed carpet. Since the carpet is not attached in a conventional manner, it can be lifted off the intermediate member at any time and without special tools. The carpet can be removed by merely grasping the edge of the carpet, lifting the edge of the carpet off the intermediate member and rolling the carpet into a roll. The carpet can then be taken to a remote location for cleaning. After the carpet is cleaned, it can be reinstalled by merely unrolling the carpet on the intermediate member in the same orientation as originally installed so that the edges of the carpet match the walls of the room in which the carpet is installed. No special tools or materials are required to reinstall the carpet.

The same procedure can be followed when it is desired to replace an old carpet with a new carpet. The old carpet can be removed as described above, and the new carpet can be installed as described above. Thus, it should be appreciated that the present invention requires significantly less labor to initially install a carpet, to remove the old carpet and to replace an old carpet with a new carpet.

In an alternate embodiment of the present invention, the method of the present invention is practiced as follows. An intermediate member is applied to the floor and extends from wall-to-wall and may optionally be either mechanically or adhesively secured thereto when required. The intermediate member has an upper surface comprising a skid resistant plastic film that will adjoin the back of the carpet. Optionally, the intermediate member also has a bottom surface comprising a skid resistant plastic film that will adjoin the substrate. The carpet back also comprises a skid resistant plastic film. When the carpet back is applied to the upper surface of the intermediate member, the respective plastic films provide a skid resistant attraction, thereby inhibiting relative lateral movement between the carpet and the intermediate member while still permitting the carpet to be lifted vertically off of the intermediate member. When the intermediate member is applied to the substrate, the plastic film of the intermediate member provides a skid resistant attraction to the substrate, thereby inhibiting relative lateral movement between the carpet and the substrate while still permitting the carpet to be lifted vertically off of the substrate. The carpet is then trimmed to fit the dimensions of the floor that it is covering. No tack strips are used to secure the carpet, and no stretching or "kicking in" of the carpet is required. The carpet and the intermediate member are substantially free of adhesive for securing the carpet and the intermediate member together. The carpet merely lays on top of the intermediate member. The skid resistant properties between the plastic film on the carpet back and the plastic film on the intermediate member serve to hold the carpet in place. Furthermore, it is believed that the skid resistant properties also function to provide dimensional stability to the carpet such that changes in carpet dimensions due to changes in humidity or moisture levels that would otherwise result in wrinkling, puckering or buckling of the carpet are prevented. It is believed that the relatively small forces of the skid resistant properties of the plastic films when added over the entire area of the carpet result in a relatively substantial force that prevents the carpet from moving significantly due to humidity induced changes in size. Thus, wrinkling, puckering and buckling are prevented even though the carpet is not attached at its edges with tack strips, hooks and loops or adhesives and is not under tension.

In another alternate embodiment of the present invention, the method of the present invention is practiced as follows. A carpet having a back surface comprising a skid resistant plastic film is applied to a substrate. When the carpet back is applied to the substrate, the plastic film provides a skid resistant attraction to the substrate, thereby inhibiting relative lateral movement between the carpet and the substrate while still permitting the carpet to be lifted vertically off of the substrate. The carpet is then trimmed to fit the dimensions of the floor that it is covering. No tack strips are used to secure the carpet, and no stretching or "kicking in" of the carpet is required. The carpet is substantially free of adhesive for securing the carpet and the substrate together. The carpet merely lays on top of the substrate. The skid resistant properties between film on the carpet back and the substrate serve to hold the carpet in place. Furthermore, it is believed that the skid resistant properties also function to provide dimensional stability to the carpet such that changes in carpet dimensions due to changes in humidity or moisture levels that would otherwise result in wrinkling, puckering or buckling of the carpet are prevented. It is believed that the relatively small forces of the skid resistant properties of the plastic film when added over the entire area of the carpet result in a relatively substantial force that prevents the carpet from moving significantly due to humidity induced changes in size. Thus, wrinkling, puckering and buckling are prevented even though the carpet is not attached at its edges with tack strips, hooks and loops or adhesives and is not under tension.

In one embodiment of the present invention, the intermediate member comprises a layer of foam material. The foam material can be made from any blown or frothed elastomeric material, such as natural rubber, synthetic rubbers, for example, styrene-butadiene, and the like. It is especially preferred that the intermediate member comprise a polyurethane foam having a thickness of about 1 mm to about 12 mm and a density of about 1.5 to about 40 pounds per cubic foot; preferably, approximately 20 pounds per cubic foot. A suitable polyurethane foam is available under the trademark KangaCushion™ from Textile Rubber & Chemical Co. Inc. of Dalton, Ga.

In accordance with an embodiment of the present invention, at least one surface of the intermediate member and the back of the carpet are comprised of a skid resistance plastic film. The skid resistant plastic films has a physical attraction or affinity to similar skid resistant plastic films that resist relative lateral movement after contact between such films, but permit the films to be pulled apart. In another embodiment, the skid resistant plastic film that comprises the back of the carpet has a physical attraction or affinity to the substrate that resists relative lateral movement after contact between the film and the substrate, but permits the film and substrate to be pulled apart.

An example of such skid resistant plastic films is cling-type plastic wrap used to wrap and preserve food items. In terms of stress-strain properties, plastics can be divided into four types: (1) flexible thermoplastics, capable of large plastic deformations; (2) rigid thermoplastics; (3) rigid thermosets; and (4) elastomers or rubbers. From this definition of plastics, it is contemplated that the flexible thermoplastics and the elastomers or rubbers are suitable for use in the present invention. Specific plastics that are useful in the present invention include, but are not limited to, ethylene vinyl alcohols, polyamides (Nylon 6), Nylon 6/rubber modified, polybutylene, low density polyethylene, high density polyethylene, low density polyethylene/ethyl vinyl acetate copolymers, low density polyethylene/ethyl ethylene acetate copolymers, polypropylene, polyvinylidenechloride copolymer, thermoplastic polyurethanes, krayton, rubber modified polystyrene, silicone rubber, styrene-butadiene, acrylics and copolymers thereof, natural rubber, latex and mixtures thereof.

Some typical properties of plastics suitable for use as the skid resistant plastic film of the present invention are set forth in Table 1 below.

TABLE 1

| Plastic | Specific Gravity | Melting Point ° C. | Modulus M-PSI | Hardness | Percent Elongation |
|---|---|---|---|---|---|
| Ethylene vinyl-alcohol | 1.12–1.20 | 142–191 | | 75–80$^a$ | 180–330 |
| Polyamide, Nylon 6 | 1.12–1.14 | 210–220 | | 100–105$^b$ | 100–300 |
| Nylon 6/Rubber Modified | 1.07–1.17 | 210–220 | | 50$^b$ | 150–270 |
| Polybutylene | 0.909–0.915 | 118–130 | | 45$^a$ | 160–350 |
| LDPE | 0.910–0.925 | 98–115 | 14–38 | 44–50$^a$ | 100–650 |
| HDPE | 0.947–0.965 | 125–135 | 85–160 | 63–65$^a$ | 170–800 |
| LDPE/EVA | 0.922–0.943 | 103–110 | | 17–45$^a$ | 200–700 |
| LDPE/EEA | 0.930–0.941 | | | 17–45 | 700–750 |
| Polypropylene | 0.900–0.910 | 160–175 | 1.4–1.7 | 80–90$^c$ | 100–600 |
| Polyvinylidenechloride copolymer | 1.65–1.72 | 160–172 | 200–600 | 55$^c$ | 350–400 |
| TPU | 1.12–1.24 | 75–137 | | 75$^d$–70$^a$ | 60–550 |

$^a$= Shore D
$^b$= Rockwell - M
$^c$= Rockwell - D
$^d$= Shore A

The skid resistant plastic film in accordance with the present invention is in the form of a film. The term film is used herein in its conventional sense or meaning. Typically, films have a thickness of about 0.0005 to about 0.012 inches.

The foam layer and plastic film may be prepared separately and then laminated together using any conventional methods, such as thermal lamination or lamination with adhesives. However, it is preferred that the foam layer be prepared in situ on the plastic film or the film may be formed in situ on the foam in a continuous process.

The extruded plastic film may be positioned on a moving endless conveyor belt where it is transported to a foam deposit station. At the foam deposit station, a quantity of a frothed foam-forming composition is deposited on the side of the plastic film opposite the conveyor belt. The foam/film composite is passed under a doctor bar that doctors the foam on the film into a uniform layer of a desired thickness. The foam layer on the film is then cured or is permitted to cure depending on the particular type of foam-forming composition that is used, such as by passing the foam/film composite through a forced air oven at a desired temperature. The film and attached cured foam layer may then be stripped from the conveyor belt and rolled into a take-up roll.

Alternately, a quantity of a frothed foam-forming composition may be deposited on a non-stick, moving endless conveyor belt. The foam on the moving belt is then passed under a doctor bar that doctors the foam on the belt into a uniform layer of a desired thickness. A layer of plastic film is then applied to the surface of the foam. The foam/film composite is then cured or is permitted to cure depending on the particular type of foam-forming composition that is used, such as by passing the foam/film composite through a forced air oven at a desired temperature. The film and attached cured foam layer may then be stripped from the conveyor belt and rolled into a take-up roll.

In an alternate embodiment, a quantity of a frothed foam-forming composition may be deposited on a non-stick, moving endless conveyor belt. The foam on the moving belt is then passed under a doctor bar that doctors the foam on the belt into a uniform layer of a desired thickness. The foam layer on the moving belt is then cured or is permitted to cure depending on the particular type of foam-forming composition that is used, such as by passing the foam layer on the moving belt through a forced air oven at a desired temperature. A quantity of a liquid film-forming composition can then be applied to the surface of the foam layer opposite the conveyor belt, such as by dip coating or roller coating. The film-forming coating on the foam surface is then cured or is permitted to cure depending on the particular type of film-forming composition that is used, such as by passing the film-forming coating on the foam surface through a forced air oven at a desired temperature.

The foam may also be formed in situ on the carpet back. The carpet may be positioned on a moving endless conveyor belt such that the pile side is adjacent the conveyor belt. The carpet is then transported on the conveyor belt to a foam deposit station. At the foam deposit station, a quantity of a frothed foam-forming composition is deposited on the back side of the carpet; i.e., the side opposite the face pile. An extruded film is then brought into contact with the uncured foam on the carpet back. The carpet/foam/film laminate is then passed under a gauge roller such that the foam on the carpet back is formed into a uniform layer of a desired thickness. The carpet/foam/film laminate is then cured or is permitted to cure depending on the particular type of foam-forming composition that is used, such as by passing the laminate through a forced air oven at a desired temperature. The carpet/foam/film laminate may then be stripped from the conveyor belt and rolled into a take-up roll.

Alternately, the film may be adhesively secured to the carpet. The carpet may be positioned on a moving endless conveyor belt such that the pile side is adjacent the conveyor belt. The carpet may then be moved to an adhesive deposit station. At the adhesive deposit station, a quantity of an adhesive is applied to the carpet back. The carpet back can comprise a primary carpet backing material, a secondary carpet backing material, such as ActionBak®, and/or an integrally attached foam cushion backing. The adhesive may be applied in any manner that provides an even coating on the carpet backing, such as dip coating or roller coating. An extruded plastic film is then brought into contact with the uncured adhesive-coated carpet back. The carpet and film laminate is then passed under a press roller which pushes the film into intimate contact with the carpet back. The carpet/adhesive/film laminate is then cured or is permitted to cure depending on the particular type of adhesive composition that is used, such as by passing the laminate through a forced air oven at a desired temperature. The carpet/adhesive/film laminate may then be stripped from the conveyor belt and rolled into a take-up roll.

In another embodiment of the present invention, the intermediate member comprises a core formed from a woven material and having a skid resistant plastic film formed on both surfaces of the intermediate member; i.e., a film layer forms both the top and bottom surfaces of the intermediate member. The woven material from which the core of the intermediate member is made is any substantially dimensionally stable material, such as ActionBak® (leno woven flat strand polypropylene), woven fiberglass, wire cloth, woven polypropylene, woven polyethylene, fiberglass mesh, woven cotton duck, woven jute and other woven natural fibers. The intermediate member may also include a foam layer formed on at least one surface of the woven material, preferably both surfaces, such that the intermediate member comprises a multi-layer structure of an inner layer or core of woven material, a foam layer and an outer layer of skid resistant plastic film.

In still another embodiment of the present invention, the intermediate member comprises a core formed from a non-woven material, layers of foam formed on both surfaces of the nonwoven layer and skid resistant plastic films formed on both surfaces of the foam layers; i.e., a film layer forms both the top and bottom surfaces of the intermediate member. The nonwoven material from which the core of the intermediate member is made is any suitable fibrous material, such as Sontara™ from E. I. DuPont de Nemours & Co., Colbond nonwovens from Colbond Inc., Enka, N.C. and fiberglass mat from Manville, Denver, Colo. The intermediate member may also include a foam layer formed on at least one surface of the nonwoven material, preferably both surfaces, such that the intermediate member comprises a multi-layer structure of an inner layer or core of nonwoven material, a foam layer and an outer layer of skid resistant plastic film.

In a further embodiment of the present invention, an intermediate member is not used. A carpet having a backing comprising a skid resistant plastic film is applied to the substrate such that the plastic film on the carpet is adjacent and contacts the substrate. The attraction between the plastic film on the carpet and the substrate is such that the carpet has a physical attraction or affinity to the substrate that resists relative lateral movement after contact between the film and the substrate, but permits the film and substrate to be pulled apart. It is believed that the relatively small forces of the skid resistant properties of the plastic film when added over the entire area of the carpet result in a relatively substantial force that prevents the carpet from moving significantly due to humidity induced changes in size. Thus, wrinkling, puckering and buckling are prevented even though the carpet is not attached at its edges with tack strips, hooks and loops or adhesives and is not under tension. Optionally, it may be desirable to apply a skid resistant coating to the substrate before the carpet is applied thereto. Such skid resistant coatings have been described above. Furthermore, when the substrate is concrete, it may be desirable to seal the concrete before the carpet is applied thereto. Sealers for concrete are well known to those skilled in the art.

The following examples are illustrative of the present invention and are not intended to limit the scope of the invention as set forth in the appended claims.

EXAMPLE 1

A basement room approximately 20 feet by 20 feet is to be carpeted using the present invention. The basement floor is concrete and is located below grade. In summer, the basement is subjected to considerable amounts of humidity; whereas, in winter the humidity is quite low. Therefore, the basement environment is subjected to relatively large seasonal humidity variations.

The old carpet is removed and the floor is cleaned of any remaining debris so that the concrete floor presents a clean smooth surface. The tack strips from the old carpet are removed and discarded.

A tufted carpet having a nylon face pile and a secondary backing of ActionBak® is placed on the concrete floor with the face pile down or adjacent the floor. The carpet is trimmed with a conventional carpet knife to conform to the size and shape of the room so that the edges of the intermediate carpet meet the baseboard of the vertical walls bordering the room.

A similar piece of carpet with a nylon face pile and a secondary backing of ActionBak® is placed on the intermediate carpet such that the ActionBak® of the carpet contacts the ActionBak® of the intermediate carpet. The top carpet is then trimmed with a conventional carpet knife to conform to the size and shape of the room so that the edges of the carpet meet the baseboard of the vertical walls bordering the room. No other means of securing the carpet to the floor are used.

Over a period of one year, the carpet is observed. During that time period no wrinkling, puckering or buckling of the carpet is observed.

EXAMPLE 2

An office hallway approximately 5 feet by 40 feet is to be carpeted using the present invention. The hallway is concrete and heavily trafficked.

The old carpet is removed and the floor is cleaned of any remaining residue or debris so that the concrete floor presents a clean smooth surface. The tack strips from the old carpet are removed and discarded.

A coating of an acrylic polymer obtained from B. F. Goodrich under the trademark Hystretch V-43 is applied to the concrete floor. The coating is applied at the rate of 2 oz per square yard of floor. It is estimated that the coating has a thickness of approximately 0.10 mm. When the coating is dry, it has a slight tack to the touch.

A piece of tufted carpet with a nylon face pile and an integrally attached polyurethane foam cushion is obtained. The foam cushion is approximately 0.25 inches thick and has a density of approximately 7 pounds per cubic foot. The surface of the foam cushion has a skin coating of the same acrylic polymer that is applied to the floor. The carpet is rough cut to a size slightly larger than the size of the hallway. The carpet is then placed on the floor so that the foam cushion is adjacent the floor; i.e., so the coated polyurethane foam surface contacts the intermediate coating on the floor. The carpet is then trimmed with a conventional carpet knife to conform to the size and shape of the hallway so that the edges of the carpet meet the baseboard of the vertical walls bordering the hallway.

Over a period of one year, the carpet is observed. During that time period no wrinkling, puckering or buckling of the carpet is observed. After the one year period, the carpet is removed by grasping the edge of the carpet and pulling up the edge. The carpet is then gradually rolled into a roll. The roll of carpet is taken to a commercial carpet cleaner and cleaned using conventional rug cleaning apparatus.

The cleaned carpet is then placed back down on the hallway floor so that the foam cushion is adjacent the floor and so that the edges of the carpet meet the walls. Over an additional period of one year, the carpet is observed. During the second time period, no wrinkling, puckering or buckling of the carpet is observed.

EXAMPLE 3

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaCushion™ obtained from Textile Rubber & Chemical Company, Inc. is rough cut to a size slightly larger than the living room. The KangaCushion™ is a 2 mm shoe foam having a laminated structure of a nonwoven spun polyester layer and a polyurethane foam layer. The KangaCushion™ is laid on the plywood floor so that the nonwoven layer is adjacent the floor. The KangaCushion™ is then trimmed with a conventional carpet knife to conform to the size and shape of the living room so that the edges of the KangaCushion™ meet the baseboard of the vertical walls bordering the living room.

The KangaCushion™ is then rolled up half way from one of its edged. A coating of an acrylic polymer obtained from B.F. Goodrich under the trademark Hystretch V-43 is applied to the exposed portion of the plywood floor. The polymer is applied at the rate of 2 oz per square yard of floor. It is estimated that the coating has a thickness of approximately 0.10 mm. The KangaCushion™ is then rolled back down onto the dried skid resistant polymer. The other half of the KangaCushion™ is then rolled up from the opposite edge. The polymer is then applied to the other portion of the plywood floor in the same manner described above. The KangaCushion™ is then rolled back down onto the polymer.

A piece of tufted carpet with a polyester face pile and an secondary backing of ActionBak® is obtained. The carpet is rough cut to a size slightly larger than the size of the living room. The carpet is then placed on the floor so that the ActionBak® is adjacent the foam layer of the KangaCushion™. The carpet is then trimmed with a conventional carpet knife to conform to the size and shape of the living room so that the edges of the carpet meet the baseboard of the vertical walls bordering the hallway.

Over a period of one year, the carpet is observed. During that time period no wrinkling, puckering or buckling of the carpet is observed.

EXAMPLE 4

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaCushion™ obtained from Textile Rubber & Chemical Company, Inc. is rough cut to a size slightly larger that the living room. The KangaCushion™ is a 2 mm shoe foam having a laminated structure of a nonwoven spun polyester layer and a polyurethane foam layer. The Kanga- Cushion™ is laid on the plywood floor so that the foam layer is adjacent the floor. The KangaCushion™ is then trimmed with a conventional carpet knife to conform to the size and shape of the living room so that the edges of the KangaCushion™ meet the baseboard of the vertical walls bordering the living room.

A piece of tufted carpet with a polyester face pile and a secondary backing of ActionBak® is obtained. The carpet is rough cut to a size slightly larger than the size of the living room. The carpet is then placed on the floor so that the ActionBak™ is adjacent the nonwoven layer of the KangaCushion™. The carpet is then trimmed with a conventional carpet knife to conform to the size and shape of the living room so that the edges of the carpet meet the baseboard of the vertical walls bordering the hallway.

Over a period of one year, the carpet is observed. During that time period no wrinkling, puckering or buckling of the carpet is observed.

EXAMPLE 5

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaBack® carpet is obtained from Textile Rubber & Chemical Company, Inc. The KangaBack® carpet has a one-fourth inch layer of polyurethane foam integrally formed on the carpet back. The surface of the foam on the carpet is coated with a styrene-butadiene rubber adhesive applied at a rate of 2 to 4 ounces per square yard. A sheet of 4 mil polyethylene film the same size as the carpet is applied to the adhesive-coated foam and pressed into intimate contact therewith. The carpet/foam/film composite is placed in a forced air oven at approximately 275° F. for a period of 2–5 minutes to permit the adhesive to cure.

An intermediate member is prepared by placing a layer of ActionBak® on an endless conveyor belt. The belt moves the ActionBak® on the belt to a foam deposit station. At the foam deposit station, a quantity of frothed uncured polyurethane composition is applied to the ActionBak®. The polyurethane composition has the formula shown in Table 2 below.

TABLE 2

| Ingredient | Parts by Weight |
| --- | --- |
| Polyol A | 90 |
| Polyol B | 10 |
| Filler A | 40 |
| Filler B | 40 |
| Silicone A | 0.25 |
| Polyisocyanate B | 46.1 |
| Catalyst A (the NCO/OH ratio is 1.2/1) | 0.06 |

In Table 2 above, Polyol A is a glycerine initiated polyoxypropylene glycol end capped with about 15 weight percent ethylene oxide. The resultant primary hydroxyl-containing polyether polyol had an average OH equivalent weight of about 1650. Polyol B is diethylene glycol having an average OH equivalent weight of about 53. Polyisocyanate A is an 80/20 mixture of 2,4-/2,6-toluene diisocyanate having an average NCO equivalent weight of about 87. Polyisocyanate B is prepolymer prepared by reacting an excess of polyisocyanate A with a polyol mixture consisting of 64 weight percent of polyol C and 36 weight percent of polyol D. The resultant isocyanate-containing prepolymer had an NCO content of about 26.7% and an average NCO equivalent weight of about 157. Polyisocyanate C is a carbodiimide modified methylene diphenyldiisocyanate having an NCO equivalent weight of about 143 commercially available from Dow Chemical Co. as ISONATE 143L. Catalyst A is di-n-butyl tin. bis(isooctylmercaptoacetate), commercially available from Witco Chemical Co. as Fomrez UL-6. Catalyst B is dimethyl tin dilaurate commercially available from Witco Chemical Co. as Fomrez UL-28. Filler A is alumina trihydrate commercially available from Kaiser Aluminum Company as H36U. Filler B is calcium carbonate commercially available from Georgia Marble Company as D-70. Silicone A is a nonhydrolyzable poly(dimethyl siloxane) polyoxyethylene copolymer having a weight average molecular weight of about 4000 commercially available from Dow Corning Corporation as DC- 197.

The belt then moves the ActionBak® coated with the frothed, uncured polyurethane composition under a doctor bar which forms the polyurethane composition into a uniform layer of a thickness of approximately ⅛ th of one inch. The conveyor belt then passes over a series of heated platens which heat the ActionBake and polyurethane froth to a temperature of approximately 250° F. for a period of 2–5 minutes to permit the polyurethane to cure. The conveyor belt carrying the ActionBak® and cured polyurethane foam on one side of the ActionBak® then moves to an adhesive deposit station. A quantity of 2–4 ounces per square yard of styrene-butadiene rubber adhesive is applied to the top surface of the polyurethane foam by roller coating. A layer of 2 mil polyethylene film is applied to the uncured adhesive. The conveyor belt passes the ActionBak®/foam/adhesive/film composite under a gauge roller that presses the polyethylene film into intimate contact with the adhesive. The conveyor belt then passes the ActionBak®/foam/adhesive/film composite through a forced air oven at an air temperature of approximately 275° F. for a period of 2–5 minutes to permit the adhesive to cure. The composite is then stripped off the conveyor belt onto a take-up roll. The take-up roll is then run through the same machine again so that polyurethane foam, adhesive and film are formed on the other side to the ActionBak® in the same manner as described above. The finished intermediate member therefore comprises an inner layer or core of ActionBak®, a ⅛ th inch layer of polyurethane foam on each side of the ActionBak®, and a layer of polyethylene film on both surfaces of the foam.

The intermediate member prepared as described above is rough cut to a size slightly larger than the living room. The intermediate member is laid on the plywood floor so that one of the film covered surfaces thereof is adjacent the plywood floor. The intermediate member is then trimmed with a conventional carpet knife to conform to the size and shape of the living room so that the edges of the intermediate member come within one-half inch of the baseboard of the vertical walls bordering the living room.

The carpet prepared as described above is then rough cut to a size slightly larger than the living room. The carpet is laid on the intermediate member such that the film covered back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 6

A reception room of a new office building approximately 20 feet by 20 feet is to be carpeted using the present invention. The room has a concrete floor. The concrete floor, which has previously been sealed, is cleaned of any construction debris so that the concrete floor presents a clean smooth surface. No tack strips are installed.

An intermediate member is prepared as described in Example 5 above. The intermediate member is rough cut to a size slightly larger than the living room. The intermediate member is laid on the concrete floor so that one of the film covered surfaces thereof is adjacent the concrete floor. The intermediate member is then trimmed with a conventional carpet knife to conform to the size and shape of the living room so that the edges of the intermediate member come within one-half inch of the baseboard of the vertical walls bordering the living room.

A piece of tufted carpet with a polyester face pile and a secondary backing of ActionBak® is obtained. The carpet backing is coated with a layer of 2–4 ounces per square yard of a styrene-butadiene rubber adhesive. A sheet of 8 mil polyethylene film the same size as the carpet is applied to the adhesive-coated carpet back and pressed into intimate contact therewith. The carpet/film composite is placed in a forced air oven at approximately 275° F. for a period of 2–5 minutes to permit the adhesive to cure.

The carpet prepared as described above is then rough cut to a size slightly larger than the living room. The carpet is laid on the intermediate member such that the film covered back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 7

A reception room of a new office building approximately 20 feet by 20 feet is to be carpeted using the present invention. The room has a concrete floor. The concrete floor which has previously been sealed is cleaned of any construction debris so that the concrete floor presents a clean smooth surface. No tack strips are installed.

An intermediate member is prepared as described in Example 5 above. The intermediate member is rough cut to a size slightly larger than the living room. The intermediate member is laid on the concrete floor so that one of the film covered surfaces thereof is adjacent the concrete floor. The intermediate member is then trimmed with a conventional carpet knife to conform to the size and shape of the living room so that the edges of the intermediate member come within one-half inch of the baseboard of the vertical walls bordering the living room.

A piece of tufted carpet with a polyester face pile and a secondary backing of ActionBak® is obtained. The carpet is rough cut to a size slightly larger than the living room. The carpet is then laid on the intermediate member such that the back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 8

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaBack® carpet is obtained from Textile Rubber & Chemical Company, Inc. The KangaBack® carpet has a one-fourth inch layer of polyurethane foam integrally formed on the carpet back. The surface of the foam on the carpet is coated with a film forming composition as shown in Table 3 below:

TABLE 3

| Ingredient | Parts by Weight (Wet) |
|---|---|
| Goodyear 5356 SBR latex* (24% styrene, 46%–48% butadiene) | 142.86 |
| TRCC 1683** | 15.98 |
| TRCC Octawet 70*** | 2.50 |
| S-10 defoamer**** | 0.02 |
| Proxel (biocide)***** | 0.30 |
| 15% potassium hydroxide solution | 0.30 |
| Total | 161.96 |

*Goodyear 5356 SBR latex is available from Goodyear Tire & Rubber Co., Akron, Ohio
**TRCC 1683 is a curing/vulcanizing agent containing sulfur, zinc and other curing agents available from Textile Rubber and Chemical Company, Inc, Dalton, Georgia.
***Octawet 70 is a sodium salt of di-2-ethylhexyl sulfosuccinate available from Textile Rubber and Chemical Company, Inc, Dalton, Georgia.
****S-10 defoamer is available from Lenmar Chemical Co., Dalton Georgia.
*****Proxel is available from Zenica Co., Wilmington, Delaware.

The carpet/foam/film-forming composition composite is placed in a forced air oven at approximately 275° F. for a period of 2–5 minutes to permit the film-forming composition to cure thereby forming a film on the foam backing.

An intermediate member is prepared by placing a 25 mil layer of Sontara™, a nonwoven material made from polyester, on an endless conveyor belt. The belt moves the nonwoven layer to a foam deposit station. At the foam deposit station, a quantity of frothed uncured polyurethane composition is applied to the nonwoven layer. The polyurethane composition has the formula shown in Table 2 above. The belt then moves the nonwoven layer coated with the frothed, uncured polyurethane composition under a doctor bar which forms the polyurethane composition into a uniform layer of a thickness of approximately $\frac{1}{32}$ nd of one inch. The conveyor belt then passes over a series of heated platens which heat the nonwoven layer and polyurethane froth to a temperature of approximately 250° F. for a period of 2–5 minutes to permit the polyurethane to cure. The conveyor belt carrying the nonwoven layer and cured polyurethane foam on one side of the nonwoven layer then moves to an film deposit station. A quantity of the film-forming composition shown in Table 3 above is applied to the top surface of the polyurethane foam by roller coating. The conveyor belt then passes the nonwoven layer/foam/film-forming composite through a forced air oven at an air temperature of approximately 275° F. for a period of 2–5 minutes to permit the film-forming composition to cure and form a film on the foam layer. The composite is then stripped off the conveyor belt onto a take-up roll. The take-up roll is then run through the same machine again so that polyurethane foam and a film are formed on the other side to the nonwoven layer in the same manner as described above. The finished intermediate member therefore comprises in inner layer or core of nonwoven polyester, a $\frac{1}{32}$ nd inch layer of polyurethane foam on each side of the nonwoven layer and a 2–4 mil layer of styrene-butadiene film formed on each side of the foam.

The intermediate member prepared as described above is rough cut to a size slightly larger than the living room. The intermediate member is laid on the plywood floor so that one of the film covered surfaces thereof is adjacent the plywood floor. The intermediate member is then trimmed with a conventional carpet knife to conform to the size and shape of the living room so that the edges of the intermediate member come within one-half inch of the baseboard of the vertical walls bordering the living room. The carpet prepared as described above is then rough cut to a size slightly larger than the living room. The carpet is laid on the intermediate member such that the film covered back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 9

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of tufted carpet with a polyester face pile, a secondary backing of ActionBak® and a film layer as described in Example 6 is prepared. An intermediate layer (nonwoven polyester core) as described in Example 8 is prepared.

The intermediate member is rough cut to a size slightly larger than the living room. The intermediate member is laid on the plywood floor so that one of the film covered surfaces thereof is adjacent the plywood floor. The intermediate member is then trimmed with a conventional carpet knife to conform to the size and shape of the living room so that the edges of the intermediate member come within one-half inch of the baseboard of the vertical walls bordering the living room. The carpet is then rough cut to a size slightly larger than the living room. The carpet is laid on the intermediate member such that the film covered back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 10

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of tufted carpet with a polyester face pile and a secondary backing of ActionBak® is obtained. An intermediate layer (nonwoven polyester core) as described in Example 8 is prepared.

The intermediate member is rough cut to a size slightly larger than the living room. The intermediate member is laid on the plywood floor so that one of the film covered surfaces thereof is adjacent the plywood floor. The intermediate member is then trimmed with a conventional carpet knife to conform to the size and shape of the living room so that the edges of the intermediate member come within one-half inch of the baseboard of the vertical walls bordering the living room. The carpet prepared as described above is then rough cut to a size slightly larger than the living room. The carpet is laid on the intermediate member such that the ActionBak® back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 11

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaBack® carpet is prepared as described in Example 8 so that the carpet has a foam/film backing. The carpet prepared as described above is then rough cut to a size slightly larger than the living room. The carpet is laid on the plywood floor such that the film back of the carpet is adjacent and contacts the plywood floor. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 12

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of tufted carpet with a polyester face pile, a secondary backing of ActionBak® and a film layer as described in Example 6 is prepared. The carpet prepared as described above is then rough cut to a size slightly larger than the living room. The carpet is laid on the plywood floor such that the film back of the carpet is adjacent and contacts the plywood floor. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 13

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaBack® carpet is prepared as described in Example 8 so that the carpet has a foam/film backing. The carpet prepared as described above is then rough cut to a size slightly larger than the living room. The carpet is laid on the plywood floor such that the film back of the carpet is adjacent and contacts the plywood floor. The carpet is then trimmed with a conventional carpet knife to conform to the size and shape of the living room so that the edges of the carpet meet the baseboard of the vertical walls bordering the living room.

The carpet is then rolled up half way from one of its edged. A skid resistant coating of an acrylic polymer obtained from B. F. Goodrich under the trademark Hystretch V-43 is applied to the exposed portion of the plywood floor. The polymer is applied at the rate of 2 oz per square yard of floor. It is estimated that the coating has a thickness of approximately 0.10 mm. The carpet is then rolled back down onto the dried skid resistant polymer. The other half of the carpet is then rolled up from the opposite edge. The polymer is applied to the other portion of the plywood floor in the same manner described above. The carpet is then rolled back down onto the polymer so that the film back of the carpet is adjacent and contacts the plywood floor coated with the skid resistant coating.

Over a period of one year, the carpet is observed. During that time period no wrinkling, puckering or buckling of the carpet is observed.

EXAMPLE 14

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaBack® carpet is prepared as described in Example 8 so that the carpet has a foam/film backing. An intermediate member is prepared by placing a 25 mil layer of Sontara™, a nonwoven material made from polyester, on an endless conveyor belt. The belt moves the nonwoven layer on the belt to a film deposit station. A quantity of the film forming composition shown in Table 2 above is applied to the top surface of the nonwoven layer. The conveyor belt then passes the nonwoven layer/film-forming composite through a forced air oven at an air temperature of approximately 275° F. for a period of 2–5 minutes to permit the film-forming composition to cure and form a film on the nonwoven layer. The composite is then stripped off the conveyor belt onto a take-up roll. The take-up roll is then run through the same machine again so that a film is formed on the other side to the nonwoven layer in the same manner as described above. The finished intermediate member therefore comprises in inner layer or core of nonwoven Sontara™ and a 2–4 mil layer of styrene-butadiene film formed on each side of the nonwoven layer.

The intermediate member prepared as described above is rough cut to a size slightly larger than the living room. The intermediate member is laid on the plywood floor so that one of the film covered surfaces thereof is adjacent the plywood floor. The intermediate member is then trimmed with a conventional carpet knife to conform to the size and shape of the living room so that the edges of the intermediate member come within one-half inch of the baseboard of the vertical walls bordering the living room. The carpet prepared as described above is then rough cut to a size slightly larger than the living room. The carpet is laid on the intermediate member such that the film covered back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 15

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaBack® carpet is prepared as described in Example 8 so that the carpet has a foam/film backing. An intermediate member is prepared by placing a layer of ActionBak® on an endless conveyor belt. The belt moves the ActionBak® to a film deposit station. A quantity of the film-forming composition shown in Table 3 above is applied to the top surface of the ActionBak®. The conveyor belt then passes the ActionBak® film-forming composite through a forced air oven at an air temperature of approximately 275° F. for a period of 2–5 minutes to permit the film-forming composition to cure and form a film on the ActionBak®. The composite is then stripped off the conveyor belt onto a take-up roll. The take-up roll is then run through the same machine again so that a film is formed on the other side of the ActionBak® in the same manner as described above. The finished intermediate member therefore comprises in inner layer or core of ActionBak® and a 2–4 mil layer of styrene-butadiene film formed on each side of the ActionBak®.

The intermediate member prepared as described above is rough cut to a size slightly larger than the living room. The intermediate member is laid on the plywood floor so that one of the film covered surfaces thereof is adjacent the plywood floor. The intermediate member is then trimmed with a conventional carpet knife to conform to the size and shape of the living room so that the edges of the intermediate member come within one-half inch of the baseboard of the vertical walls bordering the living room. The carpet prepared as described above is then rough cut to a size slightly larger than the living room. The carpet is laid on the intermediate member such that the film covered back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 16

A living room of a new house approximately 20 feet by 40 feet is to be carpeted using the present invention. The room has a plywood subfloor. The plywood floor is cleaned of any construction debris so that the wooden floor presents a clean smooth surface. No tack strips are installed.

A piece of KangaBack® carpet is prepared as described in Example 8 so that the carpet has a foam/film backing. An intermediate member is prepared by placing a one-quarter to three-eighths inch layer of polyurethane foam carpet cushion obtained from Textile Rubber & Chemical Company, Inc. on an endless conveyor belt. The belt moves the carpet cushion to a film deposit station. A quantity of the film forming composition shown in Table 3 above is applied to the top surface of the carpet cushion. The conveyor belt then passes the carpet cushion/film-forming composite through a forced air oven at an air temperature of approximately 275° F. for a period of 2–5 minutes to permit the film-forming composition to cure and form a film on the carpet cushion. The composite is then stripped off the conveyor belt onto a take-up roll. The take-up roll is then run through the same machine again so that a film is formed on the other side of the carpet cushion in the same manner as described above. The finished intermediate member therefore comprises in inner layer or core of one-half inch polyurethane foam carpet cushion and a 2–4 mil layer of styrene-butadiene film formed on each side of the foam layer.

The intermediate member prepared as described above is rough cut to a size slightly larger than the living room. The intermediate member is laid on the plywood floor so that one of the film covered surfaces thereof is adjacent the plywood floor. The intermediate member is then trimmed with a conventional carpet knife to conform to the size and shape of the living room so that the edges of the intermediate member come within one-half inch of the baseboard of the vertical walls bordering the living room. The carpet prepared as described above is then rough cut to a size slightly larger than the living room. The carpet is laid on the intermediate member such that the film covered back of the carpet is adjacent and contacts the upper film covered surface of the intermediate member. The carpet is then trimmed with a conventional carpet knife to conform to the size and shape of the living room so that the edges of the carpet meet the baseboard of the vertical walls bordering the living room.

Over a period of one year, the carpet is observed. During that time period no wrinkling, puckering or buckling of the carpet is observed.

EXAMPLE 17

An office of a new building approximately 20 feet by 40 feet is to be carpeted using the present invention. The room has a plywood subfloor. The plywood floor is cleaned of any construction debris so that the wooden floor presents a clean smooth surface. No tack strips are installed.

Conventional carpet tiles approximately 12 inches square are used. Each carpet tile comprises a primary backing material that has been tufted to form a face pile on one side. The side of the tile opposite the face pile comprises a ¼ inch integrally formed layer of polyurethane foam. Such carpet tiles are well known in the art and are commercially available from many sources.

The carpet tiles are then modified by adhesively applying a skid resistant plastic film to the foam layer of the tile. The surface of the foam on the carpet tile is coated with a styrene-butadiene rubber adhesive applied at a rate of 2 to 4 ounces per square yard. A sheet of 6 mil polyethylene film the same size as the carpet tile is applied to the adhesive-coated foam and pressed into intimate contact therewith. The carpet tile/foam/film composite is placed in a forced air oven at approximately 275° F. for a period of 2–5 minutes to permit the adhesive to cure.

The carpet tiles are then placed on the wooden subfloor so that the film on the back of the carpet tiles contacts the wooden subfloor. The tiles are placed on the floor so that the entire floor is covered from wall-to-wall.

Over a period of one year, the carpet is observed. During that time period no wrinkling, puckering or buckling of the carpet tiles is observed.

EXAMPLE 18

A recreational vehicle approximately 10 feet by 20 feet is to be carpeted using the present invention. The floor of the recreational vehicle has a subfloor made from oriented strand board ("OSB"). The OSB is cleaned of any construction debris so that the floor presents a clean smooth surface. No tack strips are installed.

A skid resistant coating of an acrylic polymer obtained from B. F. Goodrich under the trademark Hystretch V-43 is applied to the OSB floor. The polymer is applied at the rate of 2 oz per square yard of floor. It is estimated that the coating has a thickness of approximately 0.10 mm.

A piece of KangaBack® carpet is prepared as described in Example 8 so that the carpet has a foam/film backing. The carpet prepared as described above is then cut to the precise size of the floor of the recreational vehicle using a previously prepared pattern or die. The carpet is laid on the floor such that the film back of the carpet is adjacent and contacts the coated OSB floor. The carpet is placed on the floor so that the edges of the carpet meet the baseboard of the vertical walls, cabinets or other structures bordering the carpeted area.

Over a period of one year, the carpet is observed. During that time period no wrinkling, puckering or buckling of the carpet is observed.

It is specifically contemplated that any of the wall-to-wall carpet in the previous examples can be substituted with carpet tiles that extend wall-to-wall but are of the same cross-sectional construction as the wall-to-wall carpets described therein.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of installing a wall-to-wall carpet on a substrate bounded at least partially by opposed vertical structures, said carpet having a bottom surface, said method comprising the steps of:

applying to said substrate said bottom surface of said carpet, said bottom surface of said carpet comprising a skid resistant, smooth plastic film such that said carpet resists dimensional changes due to changes in moisture or humidity without the use of tack strips securing the periphery of said carpet to said substrate, said carpet being substantially free of adhesive for retaining said carpet and said substrate together; and cutting said carpet to conform to a desired shape at least partially bounded on two sides by said opposed vertical structures.

2. The method of claim 1, wherein said carpet comprises a laminated structure comprising a textile layer an intermediate foam layer and said plastic film on a surface of said foam layer opposite said textile layer.

3. The method of claim 1, wherein said carpet comprises a multi-layered structure comprising a textile layer an intermediate foam layer and said plastic film on a surface of said foam layer opposite said textile layer.

4. The method of claim 1, wherein said carpet is a tufted carpet.

5. The method of claim 4, wherein said carpet is a woven carpet.

6. The method of claim 4, wherein said plastic film on said carpet comprises a polymer selected from polyethylene, polypropylene, polybutylene, ethylene vinyl acetate, ethylene vinyl alcohol, polyamide, polyvinylidene chloride copolymer, thermoplastic polyurethane, nylon, polyethylene/ethyl vinyl acetate copolymers, polyethylene/ethyl ethylene acetate copolymers, polypropylene, polyvinylidenechloride copolymer, krayton, rubber modified polystyrene, silicone rubber, styrene-butadiene, acrylics and copolymers thereof, natural rubber, latex and mixtures thereof.

7. The method of claim 4, wherein said plastic film on said carpet is about 0.0005 to about 0.012 inches in thickness.

8. The method of claim 4, wherein said substrate is selected from wood, plywood, linoleum, ceramic tile, vinyl tile, stone, marble and concrete.

9. A method of installing a wall-to-wall carpet on a substrate bounded at least partially by opposed vertical structures, said carpet having a bottom surface, said method comprising the steps of:

applying to said substrate said bottom surface of said carpet, said bottom surface of said carpet comprising an integrally attached foam cushion and a skid resistant, sufficiently smooth plastic film attached thereto such that said carpet resists dimensional changes due to changes in moisture or humidity without the use of tack strips securing the periphery of said carpet to said substrate, said carpet being substantially free of adhesive for retaining said carpet and said substrate together; and cutting said carpet to conform to a desired shape at least partially bounded on two sides by said opposed vertical structures.

* * * * *